(12) United States Patent
Koepping et al.

(10) Patent No.: US 8,306,689 B2
(45) Date of Patent: Nov. 6, 2012

(54) INTEGRATED NET-CENTRIC DIAGNOSTICS DATAFLOW FOR AVIONICS SYSTEMS

(75) Inventors: Craig Koepping, Wall, NJ (US); Russell Shannon, Ocean Gate, NJ (US); Thomas Richardson, Sicklerville, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 416 days.

(21) Appl. No.: 12/554,147

(22) Filed: Sep. 4, 2009

(65) Prior Publication Data

US 2011/0040442 A1 Feb. 17, 2011

Related U.S. Application Data

(60) Provisional application No. 61/233,038, filed on Aug. 11, 2009.

(51) Int. Cl.
  G01M 17/00 (2006.01)
  G06F 7/00 (2006.01)
  G06F 19/00 (2006.01)
  G06F 11/30 (2006.01)
  G07C 5/00 (2006.01)
(52) U.S. Cl. ............... 701/34.3; 701/29.1; 701/31.4; 701/31.6; 701/31.8
(58) Field of Classification Search ............. 701/29, 701/30, 31, 32, 33, 34, 35
See application file for complete search history.

(56) References Cited

U.S. PATENT DOCUMENTS

| | | | | |
|---|---|---|---|---|
| 4,905,184 A | * | 2/1990 | Giridhar et al. | 710/52 |
| 5,123,017 A | * | 6/1992 | Simpkins et al. | 714/26 |
| 5,931,877 A | * | 8/1999 | Smith et al. | 701/29 |
| 6,397,128 B1 | * | 5/2002 | Todd | 701/14 |
| 6,519,552 B1 | * | 2/2003 | Sampath et al. | 702/183 |
| 6,816,762 B2 | * | 11/2004 | Hensey et al. | 701/35 |
| 6,915,189 B2 | * | 7/2005 | Igloi et al. | 701/14 |

(Continued)

OTHER PUBLICATIONS

Shannon, Russell, et al., "Enabling Net-Centric Diagnostics in the F/A-18 Automated Maintenance Environment," IEEE Autotestcon 2008, Salt Lake City, UT, Sep. 8-11, 2008, 978-1-4244-2226-5/08/ $25.00 ©2008 IEEE, USA.
Earl H. Dare III, "Automated Test Equipment Synthetic Instrumentation," IEEE Xplore, 2005, 0/7803-9101-2/05/$20.00 ©2005 IEEE, USA.

(Continued)

Primary Examiner — Khoi Tran
Assistant Examiner — Nicholas Kiswanto
(74) Attorney, Agent, or Firm — Mark O. Glut; Mark D. Kelly

(57) ABSTRACT

A net-centric avionics diagnostics and automated maintenance environment system includes a storage medium on which is stored diagnostic data concerning the operation of systems of an aircraft and diagnostic data of aircraft systems, including BIT data, an organizational level automated maintenance environment server to transport maintenance and diagnostic information throughout the automated maintenance environment. The system also includes an organizational level diagnostics avionics tester that has a processor to execute diagnostics software for gathering, storing, and processing avionics diagnostics information. The tester is linked to an interface device that includes data acquisition hardware, standard interfaces for an avionics unit under test, and instrumentation for troubleshooting the unit under test. The organizational level diagnostics avionics tester is in network communication with the organizational level automated maintenance environment server. The system also includes a common intermediate level tester for testing a plurality of avionics modular assemblies, and an intermediate level maintenance environment server that stores historical maintenance data for use by the common intermediate level tester and by the organizational level diagnostics avionics tester.

5 Claims, 4 Drawing Sheets

U.S. PATENT DOCUMENTS

| | | | |
|---|---|---|---|
| 7,251,550 B2 * | 7/2007 | Eschborn et al. | 701/29 |
| 7,456,756 B2 * | 11/2008 | Ziarno | 340/945 |
| 7,835,734 B2 * | 11/2010 | Eckert et al. | 455/431 |
| 7,984,146 B2 * | 7/2011 | Rozak et al. | 709/225 |

OTHER PUBLICATIONS

Shannon, Russell, et al., "Realizing Net-Centric Diagnostics Within the Naval Maintenance System," IEEE Xplore, 2006, 1-4244-0052-X/06/$20.00 ©2006 IEEE, USA.

* cited by examiner

INTEGRATED NET-CENTRIC DIAGNOSTICS DATAFLOW FOR AVIONICS SYSTEMS

CROSS-REFERENCE TO RELATED APPLICATIONS

This application claims the benefit of priority from U.S. Provisional Patent Application Ser. No. 61/233,038, filed on Aug. 11, 2009.

GOVERNMENT INTEREST

The invention described herein may be manufactured, licensed, and used by or for the U.S. Government.

BACKGROUND

As avionics systems have increased in complexity and function, there have been significant advances in integrated diagnostics. Complex avionics systems that formerly required many hours of troubleshooting to isolate faults are now equipped with built-in test (BIT) systems and other types of automatic test equipment that can diagnose and self-report a wide variety of faults and failures. BIT systems typically run a suite of onboard diagnostic routines that produce fault codes and calibration data which may be used to identify defective modular component assemblies (referred to as Weapons Replaceable Assemblies (WRAs)) in avionics systems. WRA's are sealed modular units that are designed to communicate over common interfaces such as Military data bus standard MIL-STD-1553, and can be replaced quickly on the flightline from inventory in order to rapidly return an avionics system to service. WRAs that have been identified as defective may be removed and rapidly replaced on the flightline with simple hand tools. While such advances have greatly simplified the identification of potentially defective components on the flight line, the systems have not entirely lived up to expectations. The plethora of data generated by BIT systems does not always provide sufficient insight into the subtle and highly complex relationships between failure modes and faults in advanced fighter aircraft avionics to correctly diagnose defective WRAs. Multiple or ambiguous fault scenarios arising from such complex systems interrelationships are also not handled well by BIT systems. Misdiagnosis of component failures has lead to increased repair time, high false return rates (so called "A-799's") and increased aircraft downtime.

The F/A-18's electro-optical avionics pods, including the AN/ASD-10 Advanced Tactical Aerial Reconnaissance System (ATARS), AN/ASD-12 Shared Reconnaissance Pod (SHARP), and AN/ASQ-228 Advanced Targeting Forward Looking Infrared (ATFLIR) pod are examples of avionics systems which are difficult to diagnose and repair. A significant amount of diagnostic data is currently captured by BIT systems of such pods. However, diagnostic information is presently not used to full effect. Such deficiencies have wasted resources, manpower and created parts shortages as maintainers struggle to determine whether a component is bad or good.

Problems also arise from the use of specialized maintenance systems that cannot be modified to incorporate new features. An example of one such system is the AN/USM-681 Electro-Optics Pallet/Pod Tester (EOPT) System which is currently the main Organizational Level (O-level) support equipment (SE) used on the flightline to test and troubleshoot the ATARS, SHARP, and ATFLIR systems. The EOPT lacks automated diagnostic reasoning in the fault detection/fault isolation (FD/FI) test strategies it uses. Moreover, the EOPT lacks the ability to exchange data between the O-level, and I-level (Intermediate Level), D-level (Depot Level) or OEM-level (Original Equipment Manufacturer) maintenance environments. Additionally, network centric warfare (also referred to as "net-centric" warfare) is a concept that is increasingly embraced by the US Department of Defense (DoD). Part of that concept extends to net-centric maintenance, sometimes referred to as a Net-centric Diagnostic Framework (NCDF). As new diagnostic test strategies and systems are introduced, the technologies used by the EOPT systems are rapidly becoming obsolete, thus, there is an immediate need for upgradeable avionics diagnostic hardware as well as an avionics diagnostic and repair system that has the capability to work in a net-centric environment and is able to seamlessly exchange diagnostic and maintenance data between maintenance levels. Embodiments according to the present invention are directed to addressing these problems.

SUMMARY

In general, in one aspect, an embodiment of a net-centric avionics diagnostics and automated maintenance environment system includes a storage medium on which is stored diagnostic data concerning the operation of systems of an aircraft and diagnostic data of aircraft systems, including BIT data, an organizational level automated maintenance environment server to transport maintenance and diagnostic information throughout the automated maintenance environment. The system also includes an O-level diagnostics avionics tester that has a processor to execute diagnostics software for gathering, storing, and processing avionics diagnostics information. The tester is linked to an interface device that includes data acquisition hardware, standard interfaces for an avionics unit under test, and instrumentation for troubleshooting the unit under test. The O-level diagnostics avionics tester is in network communication with the O-level automated maintenance environment server. The system also includes a common I-level tester for testing a plurality of avionics modular assemblies, and an I-level maintenance environment server that stores historical maintenance data for use by the common I-level tester and by the O-level diagnostics avionics tester.

In another aspect, an embodiment of a net-centric process for diagnosing and maintaining an electro-optical avionics pod at multiple aircraft maintenance levels of an automated maintenance environment includes gathering diagnostic data and BIT data from the electro-optical avionics pod, combining the diagnostic data and BIT data with historical Consolidated Automated Support System (CASS) test results for electro-optical avionics pods, providing the combined diagnostic data, BIT data, and historical CASS test results to a first diagnostic reasoner at an O-level, the first diagnostic reasoner identifying one or more O-level test entry points for conducting tests of the electro-optical avionics pod at the O-level, testing the electro-optical avionics pod at the one or more O-level test entry points to derive O-level test results, determining whether I-level repairs will be needed for the electro-optics pod, and, sending the O-level test results to an I-level maintenance server. If I-level repairs are determined to be needed, the process further includes analyzing the O-level test results with a second diagnostic reasoner to determine one or more CASS safe-turn-on entry points for I-level testing of pod modular component assemblies, testing the pod modular component assemblies at the one or more CASS safe-turn-on entry points to obtain I-level test results, identifying one or more modular component assemblies of the electro-optical avionics pod that are likely to be defective from the I-level test results, storing the I-level test results on the I-level maintenance server, and storing the I-level test results on the O-level maintenance server.

BRIEF DESCRIPTION OF THE DRAWINGS

Embodiments according to the invention are illustrated in the accompanying drawings in which like reference numerals represent like parts throughout and in which.

DETAILED DESCRIPTION

In the following detailed description, reference is made to the accompanying drawings which are a part of this patent disclosure, and in which are shown by way of illustration specific embodiments in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art.

Figure 1:
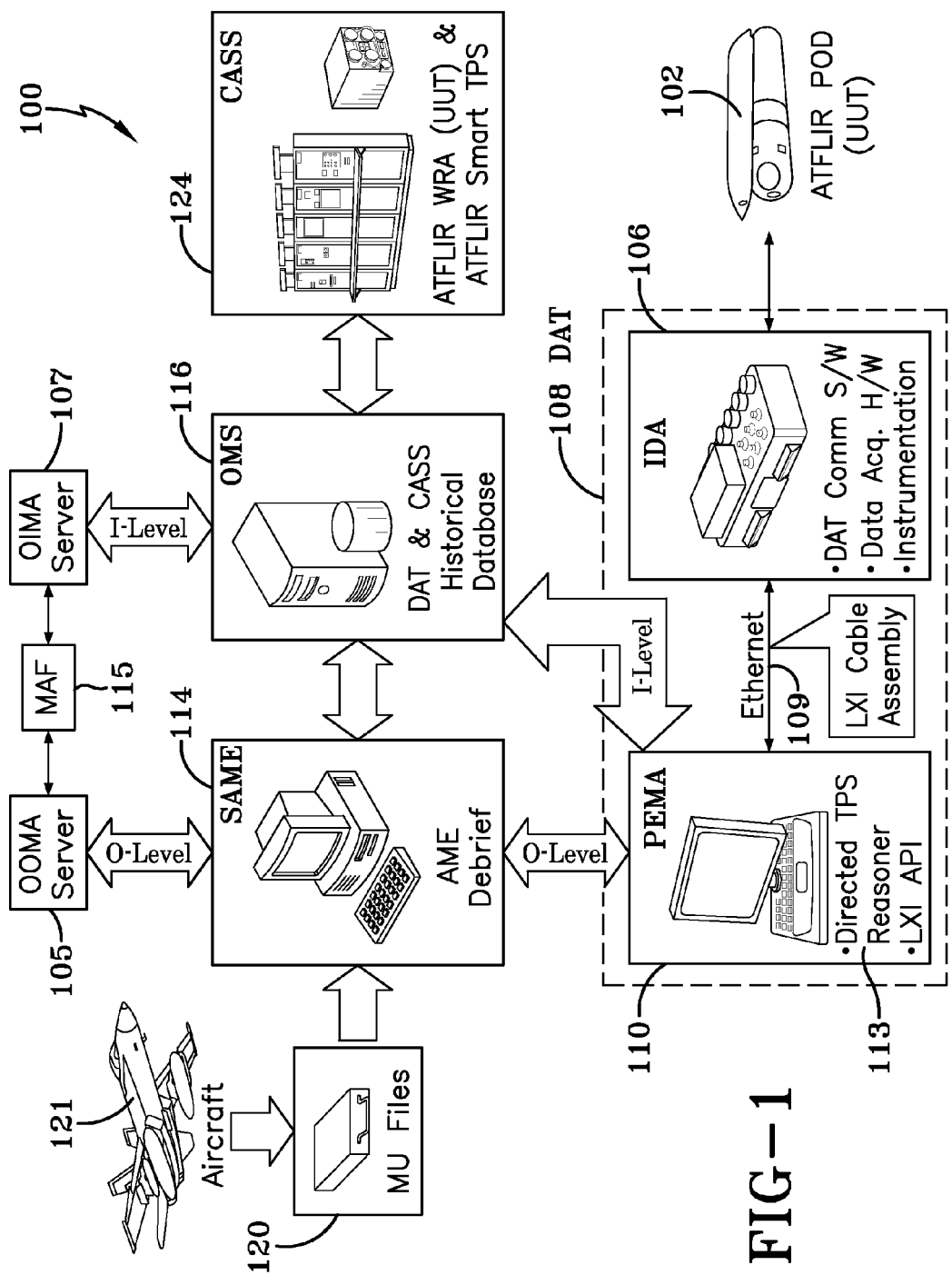
FIG. 1 is a high level structural block diagram of an embodiment of a net-centric aircraft avionics diagnostics and maintenance environment in accordance with the disclosed subject matter.

FIG. 1 is a high level structural block diagram of a net-centric aircraft avionics diagnostics and automated maintenance environment 100 (also referred to as an "automated logistics environment") in an embodiment according to the present invention. Automated maintenance environment 100 includes an aircraft 121 to be diagnosed and serviced, for example, a U.S. Navy F/A-18 Hornet. Aircraft 121 is equipped with storage media (for example, a portable removable memory unit) (MU) 120 that records diagnostic data concerning the operation of aircraft systems including the engines, airframe, avionics, life support and weapons systems and BIT data related to these systems. MU 120 also records flight data from aircraft 121. Automated maintenance environment 100 also includes an avionics unit under test (UUT) 102, for example, an ATFLIR, ATARS, or SHARP electro-optic pod that is carried by aircraft 121, a diagnostics avionics tester (DAT) 108, which includes a Portable Electronic Maintenance Aid (PEMA) 110 that executes diagnostics software for gathering, storing and processing avionics diagnostics information, and an Interface Device Assembly (IDA) 106 that includes data acquisition hardware, standard interfaces for hooking up to the UUT 102 and instrumentation for troubleshooting UUT 102, for example, MIL-STD-1553, MIL-STD-1760 video, RS-170A, RS-232, RS-422, RS-485, USB 2.0, and 1000BaseT Ethernet buses. Automated maintenance environment 100 further includes a Super Hornet Automated Maintenance Environment (SAME) server 114 that processes and transports maintenance and diagnostic information throughout the automated maintenance environment, an I-level Operations Management Software (OMS) server 116 that stores historical maintenance data for use during I-level testing, and an I-Level common avionics tester for testing avionics modular assemblies, referred to as a Consolidated Automated Support System (CASS) 124 that references the data stored on OMS 116. While Automated Maintenance Environment 100 contemplates maintenance procedures for military aircraft deployed from an aircraft carrier, alternative embodiments according to the present invention may be applied to civilian and/or military land-based aircraft and maintenance systems.

Embodiments according to the present invention build upon the Navy's Smart Test Program Set (Smart TPS). Smart TPS is an initiative designed to limit CASS run times by directing CASS runs based on BIT data that has been gathered from the aircraft at the O-level. Smart TPS has a number of limitations. One serious limitation of Smart TPS is its inability to pass maintenance information from the I-level back down to O-level tools. The data flows in one direction only. Moreover, there is no data flow between the current electro-optics tester (the AN/USM-681 EOPT) and any other device (except, of course, for the unit under test). In embodiments according to the present invention, OMS server 116 provides bidirectional network communication to the CASS system 124. At the most basic level, the interaction proceeds substantially as follows. An aircraft 121 lands at a location where O-level maintenance is provided. If something is wrong with the aircraft 121, as identified by BIT data, observables (maintainer observations of maintenance issues), and/or pilot reports, an O-level maintenance action form (MAF) 115, also referred to as a "work order," is generated against the aircraft. If I-level repair is necessary, the MAF 115 and BIT test results are sent to the I-level with the work order going from an Optimized Organizational Maintenance Activity (OOMA) server 105 at the O-level to an Optimized Intermediate Maintenance Activity (OIMA) server 107 at the I-level. The BIT results are sent from the SAME server 114 to the OMS server 116. On OMS server 116, the Smart TPS reasoner analyzes the BIT results and sends them to CASS 124 which recommends several safe-turn-on entry points to begin testing along with confidence levels associated with each safe-turn-on entry point.

Figure 2A:
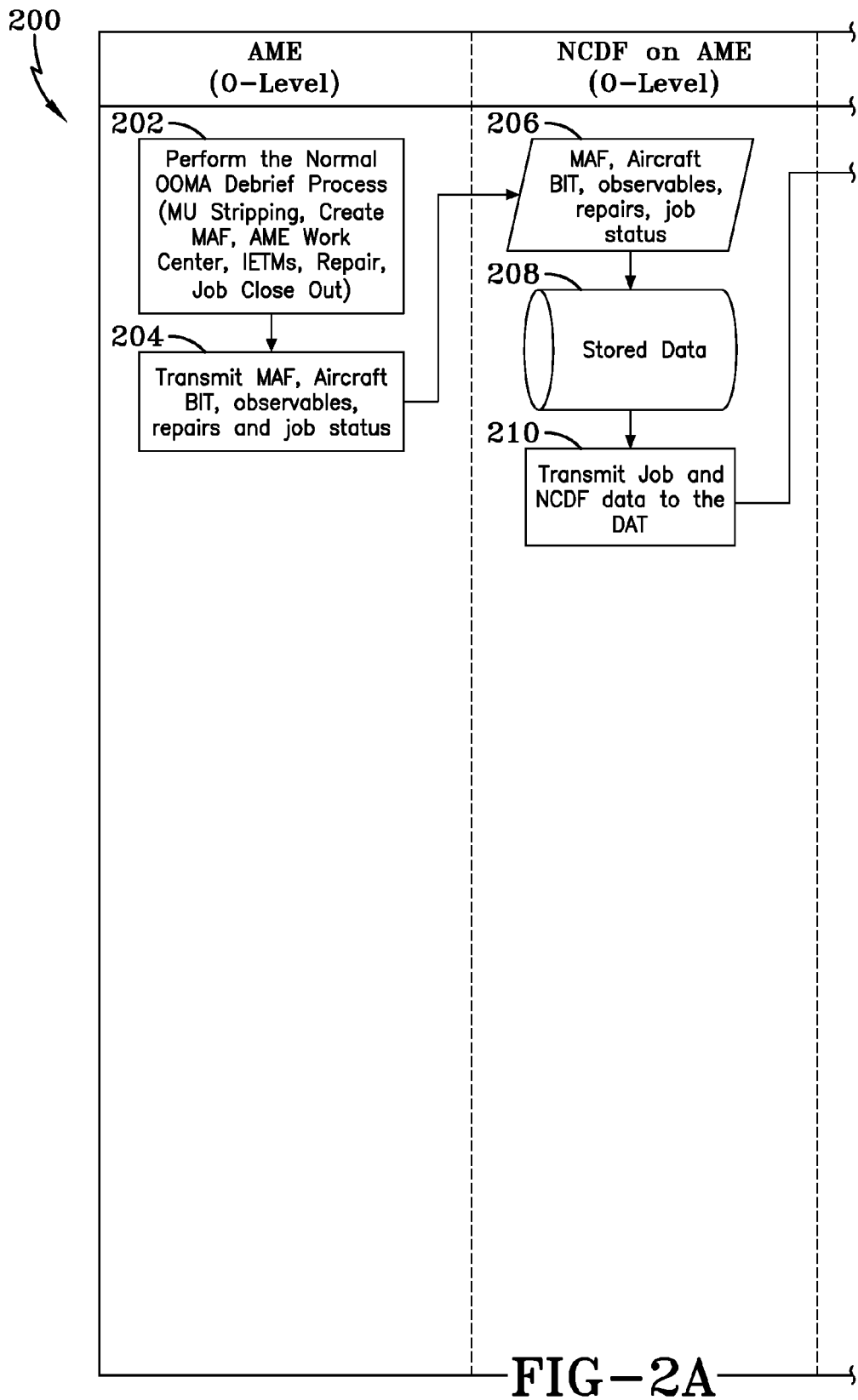
FIGS. 2A, 2B and 2C, collectively referred to hereinafter as "FIG. 2," are a process flow diagram of an embodiment of net-centric aircraft avionics diagnostics and maintenance environment in accordance with the disclosed subject matter.
Figure 2B:
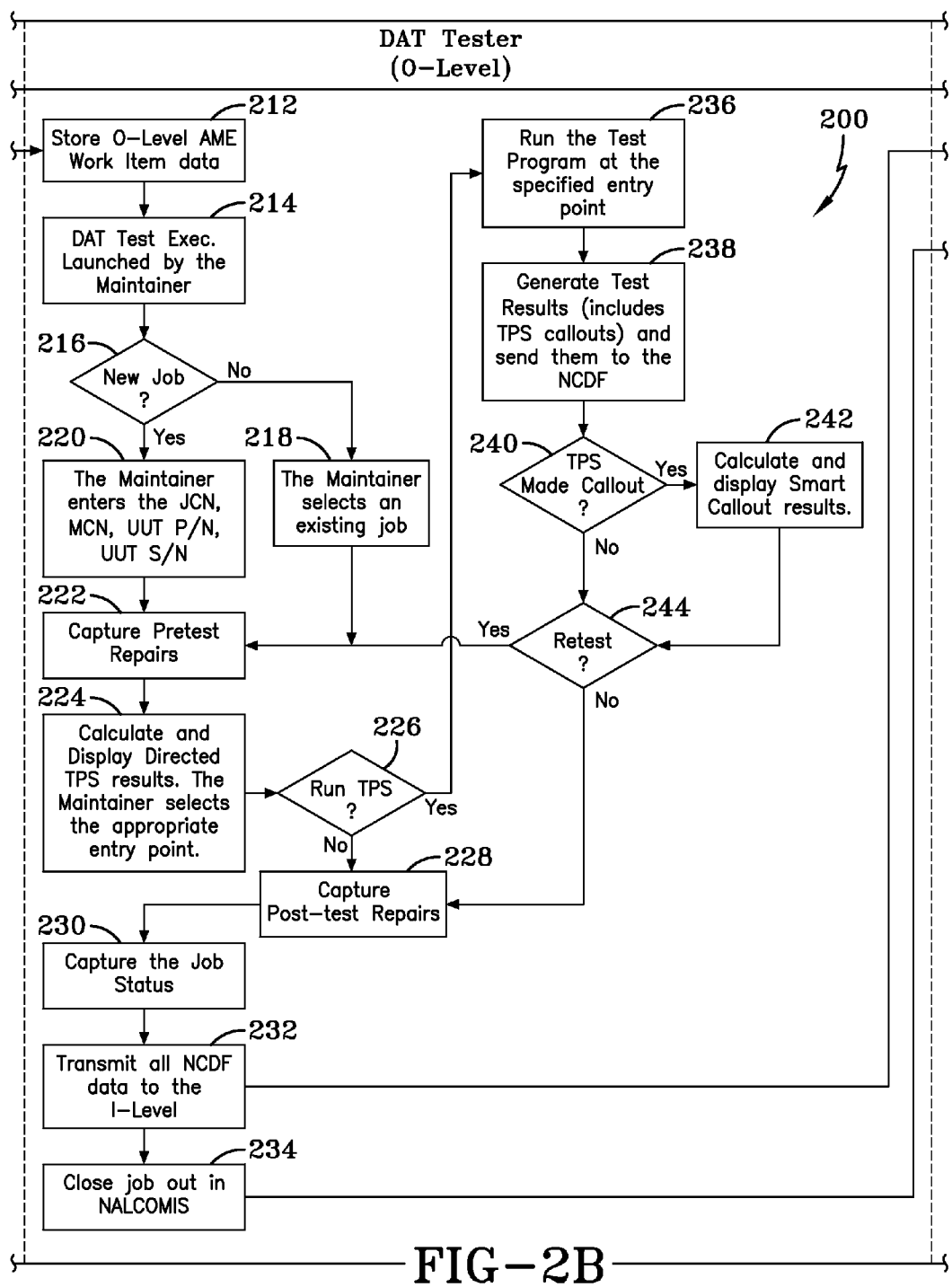
Figure 2C:
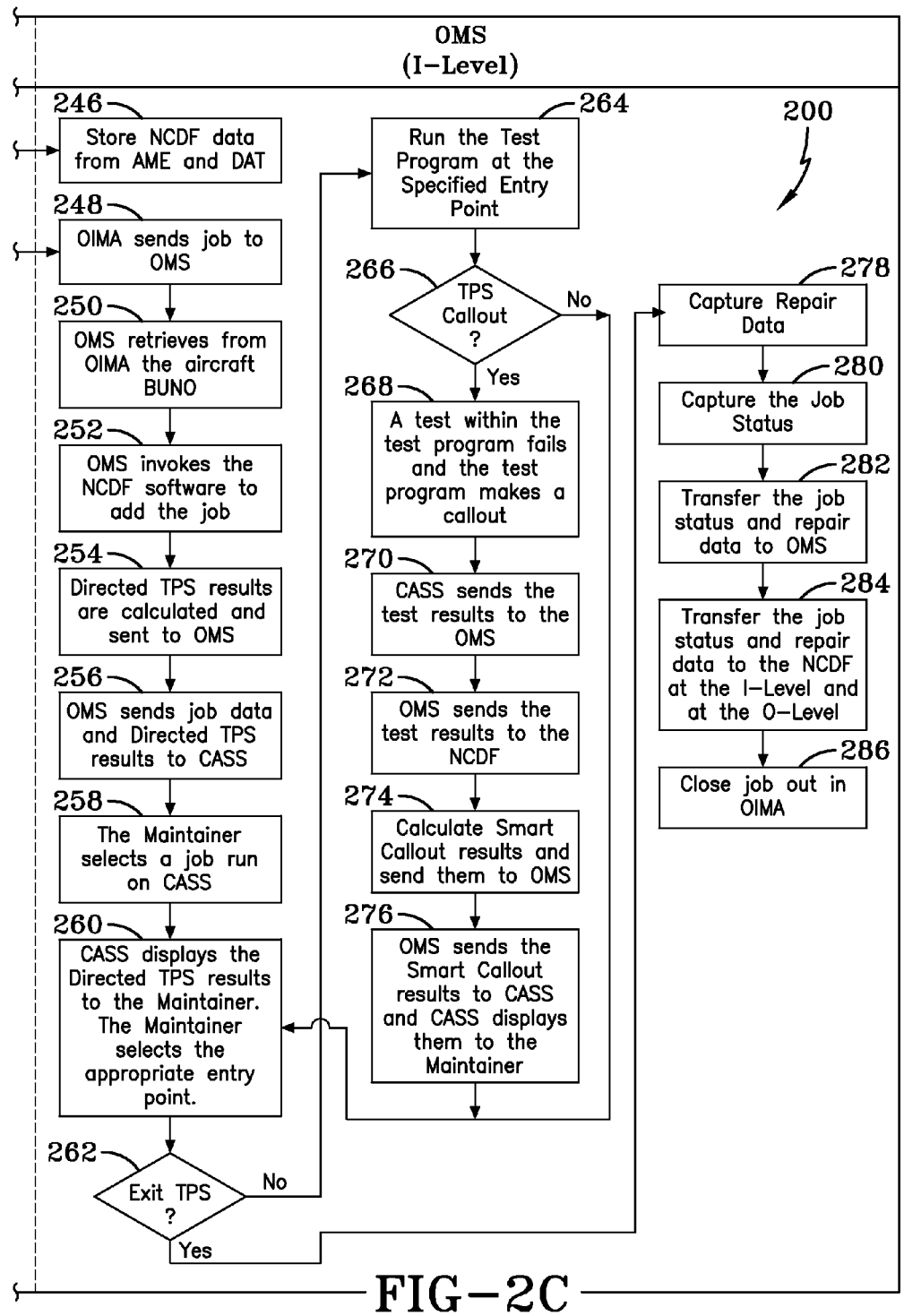

An embodiment according to the present invention of a net-centric diagnostic process 200 for diagnosing and repairing a UUT 102, which, in this example, is an electro-optics pod such as the ATFLIR, SHARP or ATARS, carried by aircraft 121, will now be described. Referring to FIG. 2, after aircraft 121 has returned from a mission and been brought to a location where O-level maintenance can be provided, such as the hangar deck or flight deck of the aircraft carrier, a normal Optimized Organizational Maintenance Activity (OOMA) debrief is performed as illustrated in process step 202. The normal OOMA debrief involves debriefing the pilot to record any maintenance issues that may have manifested during the flight, retrieving MU 120 from aircraft 121, recording any observables and uploading data, including aircraft BIT data, from MU 120 together with the pilot debriefing and any observables to SAME server 114. MU 120 is equipped with a standard personal computer interface to facilitate uploading the data to Navy maintenance computers. The currently used interface is known as "PCMCIA," which is an acronym for Personal Computer Memory Card International Association. In alternative embodiments, other standard interfaces may be used including, for example, Firewire (IEEE 1394), Universal Serial Bus (USB), EIA RS-232 and EIA RS-485 and successor standard interfaces as may be promulgated from time to time. One or more wireless interfaces such as IEEE 802.11 may also be used in alternative embodiments.

Data from MU 120 is uploaded to AME squadron server 114. Software on AME squadron server 114 strips the data from MU 120, analyzes it, and records the analysis. It also parses the BIT codes and presents to the user a list of the systems that may need to be fixed based on those BIT indications. From analysis of the information gathered in process step 202 one or more O-level Maintenance Action Forms (MAFs) 115 (also referred to as Work Orders (WOs)) are created. An O-level MAF 115 is assigned to a maintainer to fix the problems called out by the form.

Next, in process step 204, O-level MAFs 115 are transmitted along with aircraft BIT data, observables, repairs, and job status to SAME server 114. The data created in response to the aircraft BIT information in the previous step (MAF, BIT data, observables, repairs and job status) is copied from an AME application to an NCDF application both of which reside on the SAME server 114 (also referred to as "squadron server"). The NCDF application is a part of the NCDF software suite which is resident on SAME Server 114, OMS server 116 and PEMA 110. In step 208, the "NCDF for AME" application on the SAME server 114 consolidates and stores the NCDF data (MAF, BIT data, observables, repairs and job status) in a file on a hard drive or other storage media within SAME server 114. All of this data is already on the SAME server 114, but stored in different locations.

In step 210, the NCDF data (MAF, BIT data, observables, repairs, job status and historical test result information (from CASS via the OMS server) is pushed from the SAME server 114 to PEMA 110 via an existing F/A-18 AME Ethernet network. Historical test result information is already resident on the SAME server 114, having been pushed up from the I-level at the end of the last maintenance action.

In step 212, the NCDF data (MAF, BIT data, observables, repairs, job status and historical test result information) is stored on the PEMA 110. The data may be stored on a hard drive or other storage media carried by PEMA 110, for example, a flash memory, an optical disc, or a random access memory.

In step 214, the aircraft maintainer, with MAFs and the Diagnostics Avionics Tester (DAT) 108 (which includes PEMA 110 and IDA 106), goes out to the aircraft and hooks up IDA 106 to the UUT 102. The maintainer then connects PEMA 110 to IDA 106 via a shielded Ethernet cable and turns on PEMA 110 and IDA 106. PEMA 110 boots up and IDA 106 does an operational-readiness test (ORT), which is a start-up BIT for self-checking IDA 106. Once PEMA 110 has successfully booted and IDA 106 has passed its ORT, in step 214, the maintainer launches the DAT Test Executive application (the instance of the NCDF application resident on PEMA 110).

In step 216, the maintainer is queried by the DAT Test Executive application about whether this is a new job or if the maintainer is returning to finish a previously-started maintenance job. If it's an existing job, then in step 218, the maintainer selects the existing job from a drop down list or another quick reference enumeration of open jobs, provided by DAT Test Executive. If this is a new job, in step 220 the maintainer enters a job control number (JCN) and a maintenance control number (MCN) associated with the job. The maintainer also enters the part number and serial number for UUT 102. All of this data is used by the NCDF system to track the job and UUTs across maintenance levels.

Step 222 captures any pretest repairs completed prior to performing tests. This function reports any previous information already in the "NCDF for DAT" application indicating that—within this maintenance action—some repairs have already been done to the UUT 102 prior to the test that is about to execute. For example, is the maintainer about to execute a test on a system in which one WRA has already been removed and replaced?

In Step 224, Directed TPS results are calculated by the NCDF for DAT application and displayed on PEMA 110. The maintainer selects the appropriate entry point. The "NCDF for DAT" application, which includes a user interface and a Directed TPS Reasoner 113, makes diagnostic recommendations based on all of the information it has (BIT data, observables, and historical test result information) and presents the maintainer with a list of possible test program entry points and a percentage confidence level for each entry point. The current embodiment of the Directed TPS Reasoner 113 is based on a weighted decision tree model. However, alternative embodiments may employ other forms of reasoners that are based on any one of a myriad of automated reasoner algorithms, including, but not limited to, data mining, genetic, fuzzy decision tree, correlation-based, and identification of intersecting feature sets algorithms. After examining the list of possible entry points, the maintainer selects the test program entry point at which he/she wants to start testing.

At step 226, the maintainer selects whether or not to run the test program at the selected entry point. If the maintainer elects to run the test program, in step 236, the test program, which has been adapted to interface to the "NCDF for DAT" application, is run at the specified entry point. In step 236, the test program application tests the UUT 102. The test program application, running on the PEMA 110, commands the IDA 106 over Ethernet, using Local Area Network (LAN) Extensions for Instrumentation (LXI). The IDA 106 receives those instructions and interfaces with the UUT 102 appropriately to execute the tests. Test results are compiled from measurement data sent back from the UUT 102, through the IDA 106, to the PEMA 110 (i.e., to the test program application). In step 238, test results (including TPS callouts) are generated and sent to the NCDF.

If any failures were detected during testing, the test program will generate "callouts" pertaining to the failures. Step 240 determines whether any such callouts have been generated.

In step 242, the test program calculates and displays the callouts on PEMA 110 and lists the probable causes of failure in order, from the most-likely cause of failure to the least-likely cause of failure. Percentage confidence for each possible cause of failure is displayed as well. The maintainer views these test results and takes action. For example, if the test program indicates that WRA #1 may be defective with an 80% confidence level, and WRA #2 may be defective with a 20% confidence level, the maintainer might decide to remove WRA #1 first. However, there may be other real-world reasons for the maintainer to remove WRA #2 first, such as WRA #2 can be removed and replaced much more easily than WRA #1. Providing the maintainer with information about the confidence level of failure data at the O-level is a feature of embodiments according to the present invention.

After the maintainer has performed the maintenance actions called for by the test program, i.e., the maintainer has removed and replaced one or more WRAs, at step 244 the test program queries the maintainer whether the system should be retested to verify that the repair fixed the problem. The maintainer can elect to retest or to skip retesting if it is not warranted at this time.

Step 228 queries the maintainer to input data to document any post-test repairs. Step 230 queries the maintainer on the new (i.e., post-repair) status of UUT 102. In response to the query, the maintainer should, for example, indicate whether the job is complete, or whether it is still open because it needs to be revisited later. Maintainers may leave jobs incomplete because, for example, parts need to be ordered, or it is the end of their shift, or it is a complicated repair that will take multiple days, or a myriad of other reasons.

In step 232 all NCDF data is transmitted to the I-level. In addition, the PEMA 110 and IDA 106 are brought back into maintenance control. PEMA 110 is plugged into a docking station, which provides it with power and a network connection. PEMA 110 transmits its NCDF data (i.e., test data from the O-level, BIT codes, JCN, MCN, UUT P/N and UUT S/N) to the OMS server 116 at the I-level via the F/A-18 AME network. Again, a wireless interface may be employed in alternative embodiments according to the present invention.

In step 234, open jobs that have been completed are closed out in the Naval Aviation Logistics Command Operating Maintenance Information System (NALCOMIS). The O-level MAF 115 is closed in the OOMA server 105 (O-level NALCOMIS). This automatically triggers transmission of the MAF 115 information to an Optimized Intermediate Maintenance Activity (OIMA) server 107 (I-level NALCOMIS) to create an I-level MAF. This data is also transmitted over the F/A-18 network, but it is a separate maintenance control function and is not combined with the other data being sent to I-level.

WRAs that were removed and replaced at the O-level are now sent to the I-level for further trouble-shooting.

At step 246, NCDF data (test data from O-level, BIT codes, JCN, MCN, UUT P/N and UUT S/N) from the O-level via the F/A-18 AME network is stored from SAME server 114 and DAT 108 to the OMS server 116 for use at the I-level.

At step 248, OIMA server 107 sends NALCOMIS data regarding the job to the OMS server 116 which is the gateway to the CASS 124.

At step 250, the OMS server 116 retrieves the aircraft's Bureau Number (BUNO) from the OIMA NALCOMIS data. The BUNO is used to identify individual airframes (aircraft) within the naval aircraft inventory.

At step 252, the OMS server 116 runs the "NCDF for CASS" application and adds the job to this application's data. Next, in step 254, CASS test program entry points are calculated, along with confidences. The calculations are based on historical test data resident on OMS 116, O-level test results and BIT results (also sent down from O-level).

At step 254, OMS server 116 sends job data and Directed TPS results to CASS 124. The maintainer then selects a job to run on CASS 124 in step 258 and physically hooks up the likely defective WRA to CASS 124, either directly or via an interface device and any other cable connections that need to be made.

In step 260, CASS 124 presents the maintainer with several entry points and percent confidences. The maintainer has the choice at step 262 of continuing the test or exiting out and not doing any (further) testing. If further testing is selected, at step 264, the maintainer selects an entry point for the test program and then runs the test program from that entry point. In step 266, the process determines whether there were any failures identified during testing. If failures were identified, in step 268, a test within the test program fails and the test program makes a callout. In step 270, CASS sends its test results back to OMS server 116. In step 272, the OMS server 116 gives the test results to the "NCDF for CASS" application running internally on the OMS server. In step 274, the "NCDF for CASS" application calculates the appropriate callouts based on the CASS test results and historical test information resident on OMS server 116. The "NCDF for CASS" application makes the test results available to the software running on OMS server 116. The reason this is being done again is part of the interactive trouble-shooting process, in case the first entry-points did not find or test the problem. In step 276, the results of this calculation are sent back to the CASS for the I-level maintainer to see on the screen in CASS. Step 278 captures the results of CASS testing on the OMS server 116. In step 280, the job status is captured (i.e., is the job complete or incomplete?).

In step 282, the job status and test results are transferred to the OMS server 116.

In step 284, the job status and test results are made available to the "NCDF for CASS" (which is running on the OMS server 116) and the job status and test results are transmitted to SAME server 114 at O-level (which is running "NCDF for AME").

Finally, in step 286, the I-level MAF in the NALCOMIS system is closed out.

CONCLUSION

Although the present invention has been described in considerable detail with reference to certain embodiments hereof, it will be clear to one skilled in the art that the above embodiments may be altered in many ways without departing from the invention. Accordingly, the spirit and scope of the appended claims should not be limited to the description of the embodiments contained herein.

What is claimed is:

1. A net-centric aircraft avionics diagnostics and automated maintenance environment system, comprising:
    a storage medium on which is stored diagnostic data concerning the operation of systems of an aircraft, diagnostic data of aircraft systems, and BIT data for an avionics unit under test;
    an organizational level diagnostics avionics tester comprising a processor to execute diagnostics software for gathering, storing, and processing avionics diagnostics information linked to an interface device comprising data acquisition hardware, standard interfaces for the avionics unit under test, and instrumentation for troubleshooting the unit under test, wherein organizational level diagnostics avionics tester is in network communication with an organizational level automated maintenance environment server which transports the avionics diagnostic information throughout the automated maintenance environment and wherein the organizational level diagnostics avionics tester derives directed test program set results based upon BIT data, observables, and historical test result information and presents a list of possible test program entry points and a percentage confidence level for each entry point;
    a common intermediate level tester for testing a plurality of avionics modular assembles; and
    an intermediate level maintenance environment server that stores historical maintenance data for use by the common intermediate level tester and by the organizational level diagnostics avionics tester;
    wherein the intermediate level server calculates intermediate level test program entry points based on historical test data stored at the intermediate level and the avionics diagnostics information received from the organizational level diagnostics avionics tester if intermediate level repairs are determined to be needed by the organizational level diagnostics avionics tester and transmits the intermediate level test program entry points to the organizational level diagnostics avionics tester.

2. The net-centric aircraft avionics diagnostics and automated maintenance environment system according to claim 1, wherein the net-centric aircraft avionics diagnostics and automated maintenance environment system comprises a diagnostic capability for an electro-optical avionics pod.

3. The net-centric aircraft avionics diagnostics and automated maintenance environment system according to claim 1, wherein the link between the processor and the interface device of the organizational level diagnostic avionics tester comprises an LXI link.

4. A net-centric process for diagnosing and maintaining an avionics unit under test at multiple aircraft maintenance levels of an automated maintenance environment, comprising:
- gathering diagnostic data and BIT data from the avionics unit under test;
- combining the diagnostic data and BIT data with historical CASS test results from one or more avionics units;
- providing the combined diagnostic data, BIT data, and historical CASS test results to a first diagnostic reasoner at an organizational maintenance level, the first diagnostic reasoner identifying one or more organizational level test entry points for conducting tests of the avionics unit under test at the organizational level;
- testing, by a processor, the avionics unit under test at the one or more organizational level test entry points to derive organizational level test results;
- determining whether intermediate level repairs will be needed for the avionics unit under test;
- sending the organizational level test results to an intermediate level maintenance server;
- if intermediate level repairs are determined to be needed,
  - analyzing the organizational level test results with a second diagnostic reasoner to determine one or more CASS safe-turn-on entry points for intermediate level testing of one or more modular component assemblies of the avionics unit under test;
- testing the one or more modular component assemblies of the avionics unit under test at the one or more CASS safe-turn-on entry points to obtain intermediate level test results;
- identifying one or more modular component assemblies of the avionics unit under test that are likely to be defective based upon the intermediate level test results;
- storing the intermediate level test results on the intermediate level maintenance server; and
- storing the intermediate level test results on the organizational level maintenance server.

5. The net-centric process for diagnosing and maintaining an avionics unit under test at multiple aircraft maintenance levels according to claim 4, wherein the first diagnostic reasoner provides confidence levels associated with the one or more test entry points.

* * * * *